United States Patent [19]

Imamura

[11] Patent Number: 5,117,778
[45] Date of Patent: Jun. 2, 1992

[54] MOATED ANIMAL FEEDING DISH

[76] Inventor: Alvin H. Imamura, 4235 Descanso Ave., Chino Hills, Calif. 91710

[21] Appl. No.: 772,680

[22] Filed: Oct. 7, 1991

[51] Int. Cl.⁵ .............................................. A01K 5/00
[52] U.S. Cl. .................................................... 119/51.5
[58] Field of Search ................. 119/51.5, 61; 206/500, 206/506; D30/129, 130, 132, 133; D7/550, 553, 554, 555

[56] References Cited

U.S. PATENT DOCUMENTS

| D. 105,812 | 8/1937 | Siekert | 119/61 X |
|---|---|---|---|
| D. 122,576 | 9/1940 | Steinhilber | 119/61 X |
| D. 127,799 | 2/1941 | Hayt . | |
| D. 127,800 | 2/1941 | Hayt . | |
| D. 190,668 | 6/1961 | Bliss . | |
| D. 262,069 | 11/1981 | Khider . | |
| D. 265,157 | 6/1982 | McKeegan . | |
| 948,014 | 2/1910 | Lewis | 119/61 |
| 1,552,076 | 9/1925 | Mosier | 119/61 |
| 1,624,941 | 4/1927 | Fulkerson | 220/506 |
| 2,191,811 | 2/1940 | Trampier | 119/51 |
| 2,543,465 | 2/1951 | Morey | 119/51.5 |
| 2,584,301 | 2/1952 | Sinclair | 119/61 |
| 2,677,350 | 5/1954 | Prestidge et al. | 119/61 |
| 4,007,771 | 2/1977 | Michael | 119/51.5 |
| 4,225,052 | 9/1980 | Tector et al. | 220/506 |
| 4,357,905 | 11/1982 | Carpenter | 119/61 |

FOREIGN PATENT DOCUMENTS 1083379 1/1955 France .............................. 220/550

*Primary Examiner*—Gene Mancene
*Assistant Examiner*—Thomas Price
*Attorney, Agent, or Firm*—Ben E. Lofstedt

[57] ABSTRACT

An improved moated combination food and water animal feeding dish with nested offset triangular receptacles for improved resistance to tip over by maximizing the overall combined weight distribution characteristics of the food-water-dish combination which includes a pair of nested offset triangular receptacles, a floor, a first triangularly shaped dish secured to the floor, the first triangularly shaped dish having vertically arranged walls peripherally surrounding and disposed below the rim of a generally triangularly shaped second dish shaped similar to the first dish but substantially larger than the first dish and disposed so that it surrounds the first dish, whereby the apexes of the first dish are placed in close proximity to the mid-point between each of the pairs of apexes of the second dish.

6 Claims, 1 Drawing Sheet

MOATED ANIMAL FEEDING DISH

BACKGROUND OF THE INVENTION

1. Field of the Invention

The field of the invention relates to animal feeding dishes and, more particularly, to moated animal feeding dishes-wherein the animals' food is placed in a dish which is surrounded by water, or the like, to prevent ants and other creepy, crawly insects, and small animals, from crawling into the animal's food, and, more particularly, to a pair of triangular receptacles for receiving food or water which are nested in an offsetting relationship to one another.

2. Description of the Prior Art

It is well-known and recognized among pet owners, especially dogs and cats, that animal feeders, such as dishes, and the like, are nearly always positioned on the floor near an external wall where such dishes are especially accessible to crawling insects, such as ants, which have a propensity for seeking out, and, unfortunately, finding a supply of food. Such insects, once in the food, will not only contaminate the pet's food, but such insects cannot be tolerated in human habitats.

Various attempts have been made to create a pet feeder which will provide a solution to this problem of crawling insects. Among such designs are those of the moated variety. A moated pet feeder dish is simply one in which the dish holding the pet food is surrounded by water thereby forming a "moat" such as was typically found about a castle in Europe during the Middle Ages as a form of protection against attack by an enemy army. Such moated varieties are shown and described in such U.S. Pat. Nos. 948,014 (Lewis); 1,552,076 (Mosier); 2,191,811 (Tramrier); 2,543,465 (Morey); 2,584,301 (Sinclair); 2,677,350 (Prestidge); 4,357,905 (Carpenter); 4,007,711 (Michael); Des. 105,812 (); Des. 122,576 (Steinhlber); Des. 127,800 (K.Hayt, aka K. Barrie); Des. 127,799 (K.Hayt, aka K. Barrie); Des. 190,668 (Bliss); Des. 262,069 (Khider); and Des. 265,157 (McKeegan). Each of these designs have their own unique problems which make them unacceptable for one or more reasons for use by pet owners.

U.S. Pat. Nos. 948,014 (Lewis), 1,552,076 (Mosier), and 2,543,465 (Morey) depict a two (2) piece design. Such feeders present a plurality of discrete components which, of course, must be assembled and disassembled for cleaning and then reassembled before further use. Because these feeders are formed by a plurality of discrete components, they are also expensive to manufacture, and thus require a retail price which is greater than purchasers are willing to pay. And, because of their two (2) piece design, such are more prone to operational failure because without being clean from debris, and the like, the pieces will not always permit functional interconnection because they become clogged with debris, food sand, dirt, water, and are enlarged with each teardown and reinstallation. All of this is unnecessary and is avoided by the use of a single piece moated pet feeder.

U.S. Pat. No. 2,584,301 (Sinclair) is formed of a plurality of different containers 14, 16 all of which are mated to a wire-form elevated support structure or frame 12. Each container 16 is rimmed with a wide horizontal flange 38 which extends well outwardly over the associated moat element 14. Because of this wide horizontal flange which extends well over the associated moat element 14, the pet is prevented from drinking water from the moat element 14. Additionally, if one or more, of the rubber feet 22 become disengaged from the combined leg and body members 20 or wear out, the entire combination will not remain stationary but will move, and quite likely, tip over while the pet is eating therefrom. Further, in the event that food, or other debris, becomes disposed in the rather narrowly defined moat element 14, it will become inoperative. Still further, the moat element 14 is an integral part of the supporting frame 12.

U.S. Pat. No. 2,191,811 (Tramrier) is a combination pet food and water feeder which is surrounded by a shallow container for holding water to create a moat to provide a water barrier serving to prevent bugs and other insects from crawing up the sides of the bowl or main receptacle and into the same. A small tube 6 is used to allow water which is contained in compartment 4 to flow into the through 2. As a result, the water in the moat cannot be used as a water feeder for the pet because of its physical location. Additionally, if the tube 6 becomes plugged by bits of food, or the like, adding water to the trough 2 to create a moat becomes inconvenient and impractical as well as nearly impossible.

U.S. Pat. No. 2,677,350 (Prestidge) is yet another variety of moated animal or pet feeder. This integral, single piece unit envisions the use of a food feeder container 6 with a moat defined as a circumferencial trough 7. This small narrow trough 7 is purposely made inaccessible to the pet being fed by this feeder because the inventor envisioned the use of an insecticide in the trough 7. This is highly undesirable today because in the event that the entire combination is tipped over, the insecticide will be spilled and may be eaten by the pet. Depending on the insecticide used, should the pet drink it, it may well be fatal to the pet. Consequently, it is highly undesirable. Further, this moat formed by the trough 7 is not intended by the inventor for use as a water feeder as is the case with the invention disclosed herein.

U.S. Pat. No. 4,357,905 (Carpenter) relates to a moated pet feeder. Basically, this pet feeder 10 envisioned by this patent is shown in FIG. 1 of the drawings, and depicts the use of a unitary structure having a food bowl 12 and a water bowl 14. The food bowl 12 is surrounded by a moat cavity 16 which is connected to the water bowl 14 by a passage 18 in the form of an open channel. All of the other forms of this invention are simply variations of this particular structure. This is quite different from that shown in the present invention. Carpenter envisions a totally separate food and a water container not sharing a common floor, whereas the within described invention shares a common floor. Carpenter anticipates that a separate container 22 for the food will used and deposited in one of the bowls called a food bowl 12 which will displace some of the water used to form a moat thereabout through the channel and into the water bowl 14. This, of course, wets the bottom and sidewalls of the food container 22 and when withdrawn therefrom is unacceptably and needlessly messy and unsanitary. If one does not selected the right diametered food container 22, under certain conditions, no moat will be created.

U.S. Pat. No. 4,007,711 (Michael) depicts an elevated, moated pet feeder. In FIG. 5 of the drawings there is shown an annular moat or trough 18 disposed around the bowl 10 to serve as a prophylactic against crawling insects and to provide water for the pet. It is suggested that such a moat could be either an integral part of the bowl 10 or a separate piece. To accommodate pets of various sizes, or a growing pet, this pet feeder envisions a means for elevating the dish to various heights. A hinged cover or lid 14 is provided for the bowl in which the food is disposed. This moated food dish is merely a pair of concentrically arranged or disposed circular dishes; the centrally-disposed dish is used for containing the food and the outer dish is used for containing the water.

U.S. Pat. No. 122,576 (Steinhlber) relates to a salad bowl. It consists of a single integral unit containing a centrally disposed bowl with a concentrically arranged outer bowl. Both of the bowls are circumferencial in nature. This is quite similar to the arrangement shown in U.S. Pat. No. 4,007,711 (Michael).

U.S. Pat. No. 127,800 (K.Hayt, aka K. Barrie) and U.S. Pat. No. 127,799 (K.Hayt, aka K. Barrie) relate to candle and/or flower holders. However, only the structure depicted in U.S. Pat. No. 127,800 can be called "moated". If such structure were to be used for feeding and watering a pet, it would not be very useful because it would be very hard to clean having four (4) corners. Additionally, because of the arrangement of both structures, they would both be prone to be easily tipped over and the contents spilled by the pet because each is unbalanced.

U.S. Pat. No. 190,668 (Bliss) is another variety of the concentrically arranged pair of circumferencially shaped bowls forming a moat about the centrally disposed bowl. In this device, however, a reverse lip is disposed about each of the rims of the two (2) bowls. Its function is not disclosed, but, it would seem obvious as to its function of making it even more difficult for the creepy, crawling insects to march into the moated area of this structure. It is quite similar to the structure and arrangement of that which is shown and depicted in U.S. Pat. No. 122,576 (Steinhlber) and U.S. Pat. No. 4,007,711 (Michael).

U.S. Pat. No. 262,069 (Khider) is yet another variety of the concentrically arranged pair of circumferencially shaped bowls forming a moat about the centrally disposed bowl. In this device, however, the centrally disposed bowl is divided with a partition for the obvious purpose of separating the pet food from the water. The narrow moated area disposed thereabout does not contemplate its use as a water feeder for the pet.

U.S. Pat. No. 265,157 (McKeegan) relates to a soup bowl. It does not contemplate a full moated area about the center bowl which is essentially disposed in an offsetting manner with respect to the outer bowl. A handle is employed for lifting this soup bowl to one's mouth. It is not useful as a moated pet feeder such as envisioned herein.

U.S. Pat. No. 105,812 (Siekert) is a Design patent which embodies the more desireable single piece design. However, in this single piece design, the centrally disposed container is formed of a peripherally disposed wall the top of which is below the uppermost portion of the peripherally disposed wall of the outer container. This is undesirable because it allows any overfill water added to the moated area between the two (2) containers to overflow into the centrally disposed container wherein the food is deposited and held. Should this occur, the water will be mixed with the food. While this is sometimes desireable, in general, it is not desireable because it fails to offer the choice of adding water to the food or not to add the water to the food. Further, because of the circular nature of the two (2) concentrically arranged dishes, in order for the moat to be functionally useful as a water feeding dish, the dish must be unduly large in diameter creating a space problem in some cases.

Another undesirable characteristic of such prior art feeders is that the element forming the moat must be independently filled from filling the water bowl of the feeder. Two examples of such feeders are found in U.S. Pat. Nos. 2,584,301 and 4,007,711.

Another problem encountered in the prior art devices is that the combination of the animal feeder dish and the food and water are not arranged to present a low center of gravity. As a result, such combinations are frequently overturned by the animals. This occurs because the dish, and the combined weight of the food and water are not so evenly distributed throughout the entire animal feeder dish as to present a low center of gravity, thereby allowing the combination of the food, water and dish to be more easily overturned by the animal.

A yet still further problem encountered in the prior art devices is that the combination of the animal feeder dish and the food and water are not arranged to provide a combined weight distribution which resists upset and overturning of the entire combination when an aggressively hungry animal is scarfing or wolfing down the food in the centrally disposed dish. As a result, such combinations are frequently overturned by the animals. This occurs because the dish, and the combined weight of the food and water are not appropriately distributed throughout the entire animal feeder dish as to provide a broad base with the usually heavier element, namely, the water, being maximally disposed away from the centrally disposed food. As a consequence, the combination of the food, water and dish is more readily prone to be overturned by the feeding animal.

Further, frequently these animal feeder dishes are placed out of doors on a concrete floor or slab and disposed against a wall or a corner. When the animal eats, it oftentimes moves the dish with the food and water in it along the ground. This movement increases more frequently as the water and the food in the dish are consumed. With the structural arrangement, the present dish structure can be pushed by the animal into a corner or against a wall without restricting the animal's eating and drinking activities. This is not the case with the prior art animal feeding dishes.

Another major problem posed by moated pet feeders of the prior art known to the inventor is that the moated area is either too narrow for the pet to drink water therefrom, or it is arranged to create an extraordinarily large diameter combination pet food and water feeder with a moat if the pet is to be free to drink therefrom. However, the inventor herein has discovered that the overall size of the moated pet food and water feeder can be significantly reduced by the use of offsetting triangularly shaped bowls disposed one inside the other. Further, such an arrangement permits the pet to conveniently drink from either the right or left side of the centrally disposed food container. Still further, such an arrangement maximizes the quantity of water presented on both sides of the food dish to the animal using it.

A yet another object and feature of the present invention is to provide a moated feeding dish where the rim of the food dish is elevated higher than the level of the water, or "moating", dish which forms the outer dish portion of the moated feeding dish, so that the water does not splash over and enter the central food dish.

And yet still further, the conveniently shaped triangular form of the dishes promotes easy cleaning of both of the bowls since there are only three (3) corners instead of four (4) as found in a rectangularly shaped pair of containers.

The three (3) point arrangement of the triangularly shaped bowls provide for a relatively broad base effectively lowering the center of gravity of the entire unit enhancing its ability to resist tip-over by an eager, or overly hungry pet.

With these things in mind, it should be readily noted that none of the prior art moated pet feeding dishes provide solutions to the numerous and manifest problems which are solved by the unique structure set forth in the present invention as more fully disclosed hereinafterwards.

SUMMARY OF THE INVENTION AND OBJECTS

Fundamentally, the present invention relates to an improved animal food and water dish of the moated variety. This combined food and water dish for animals includes a pair of nested offset triangular receptacles, a floor, a first triangularly shaped dish secured to the floor, the first triangularly shaped dish having vertically arranged walls peripherally surrounding and disposed below the rim of a generally triangularly shaped second dish shaped similar to the first dish but substantially larger than the first dish and disposed so that it surrounds the first dish, whereby the apexes of the first dish are placed in close proximity to the mid-point between each of the pairs of apexes of the second dish, a pair of nested offset triangular receptacles, which includes a floor, a first triangularly shaped dish secured to the floor, the first triangularly shaped dish having vertically arranged walls peripherally surrounding a generally triangularly shaped second dish shaped similar to the first dish but substantially larger than the first dish and disposed so that it surrounds the first dish and whereby the apexes of the first dish are placed in close proximity to the mid-point between each of the pairs of apexes of the second dish.

One of the important and primary objects of the present invention is to provide an improved feeding tray or dish whereby the animals may be fed solid food, and water while incorporating a means to substantially reduce the likelihood that the dish will be overturned by the animals when food and water are placed therein.

It is one significant and primary object of the invention to provide a sturdy integral dish incorporating a pair of nested, offset triangular receptacles for holding food or water, and consisting of the character and type described herein which is durably constructed, reliable and efficient in its use, and relatively simple and inexpensive to manufacture.

Another principal and important object of the present invention is to provide an animal food tray constructed in such a manner as to provide a water-filled moat surrounding the solid food receptacle whereby ants and other small insects are prevented from entering the food tray.

Another primary and equally important object of the present invention is to provide a combination food and water receptacle or dish which allows the weight of the combination to be distributed to provide a relatively low center of gravity.

It is one object of the invention to provide a combination animal food dish which is so designed and constructed that when the water is poured therefrom it will not flow into the food receptacle portion of the dish.

One object of the instant invention is to provide a unique combination food and water animal dish which allows the animal to conveniently eat the food and then by merely turning its head either to the right or to the left it is able to readily drink water from the second and larger triangular receptacle which is holding the water and forming, as it were, a "moat" surrounding the first, and smaller triangular receptacle, which is utilized for the animal food.

Another object of the invention is to provide a food receptacle which can be frictionally engaged with the can in which the food is packed and provided by the producer.

A yet another object and further feature of the present invention is to provide a moated feeding dish where the rim of the food dish is elevated higher than the level of the water, or "moating" dish which forms the outer dish portion of the moated feeding dish, to substantially eliminate the possibility of the water being splashed over and into the central food dish.

Other objects and features will in part be obvious and in part be clearly pointed out as the description of the invention proceeds and shown in the accompanying drawings wherein there it described a preferred embodiment of this unique product.

DESCRIPTION OF THE PREFERRED EMBODIMENT OF THE INVENTION

Figure 1:
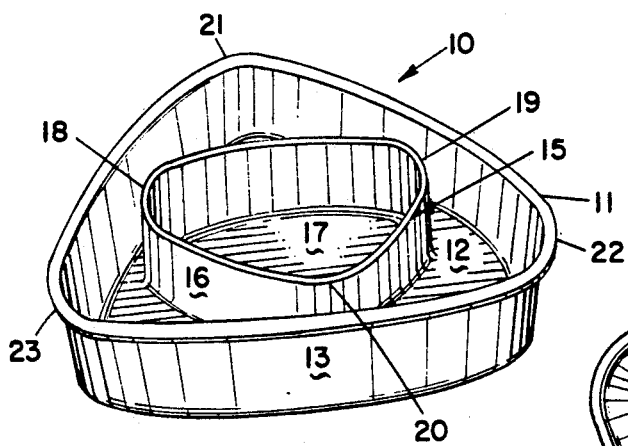
FIG. 1 is a perspective view of the present invention.
Figure 2:
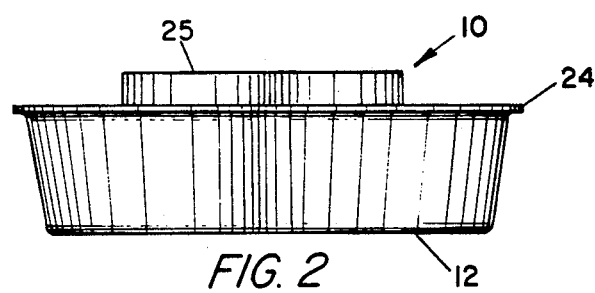
FIG. 2 is a side elevational view of the instant invention showing one of the three corners thereof.

With continuing reference now to all of the drawings herein, and with special emphasis now on FIG. 1, there is shown, in perspective form, the present invention generally shown at 10 and referred to as a combined food and water dish for animals.

The combined food and water dish 10 for animals includes a first tray or dish 11 with a floor 12, a vertically-arranged side wall 13 contoured generally in the shape of a triangle, and peripherally disposed about the floor 12 with a triangularly-contoured rim 14 thereabout.

A second tray or dish 15 having a similar triangular shape as the first dish 11 is disposed inside of the first dish 11 and shares the floor 12 with the first dish 11. The second tray or dish 15 includes a vertically-arranged sidewall 16 disposed thereabout contoured generally in the shape of a triangle and peripherally disposed about the floor 17 of the dish 15 defining the second dish 15. The apexes 18, 19, and 20 of the second dish 15 are arranged with respect to the apexes 21, 22 and 23 of the first dish 11 so that such are nearest to the mid-point distance between the respective pair of apexes 21, 22 or 22, 23 or 21, 23 of the first dish 11.

By nesting one triangularly-shaped dish, such as the second dish 15 within the other dish, in off-setting fashion, this greatly improved arrangement provides the combined food and water dish for animals 10 with some very desirable characteristics and features.

One valuable feature and characteristic developed by such a combination food and water receptacle or dish 11 which allows the major portion of the combined food-water-dish combination to be so distributed to provide a relatively low center of gravity so as to greatly enhance the combinations' capability to resist overturning by an overzealous, hungry animal.

This novel combination animal feeder dish 10 provides a physical arrangement and distribution of the relatively lighter food and from the heavier water 15 which disposes the heavier water on either side of the food from which the animal is mostly likely to feed because of the relatively closer proximity to the food in the centrally disposed food receptacle identified herein as second dish 15, to provide a combined weight distribution which resists upset and overturning of the entire combination when an aggressively hungry animal is scarfing or wolfing down the food in the centrally disposed second dish 15. Without such a feature or characteristic, a combination food and water dish such as found in the prior art, are frequently overturned by the feeding animals. This occurs because the dish, and the combined weight of the food and water are not appropriately distributed throughout the entire animal feeder dish. With the present invention, a broad base with the significant heavier water, being maximally disposed away from the centrally disposed food containing dish, that is, the second dish 15, and disposed on either side of thereof and the greatest water weight be forwardly disposed from the second dish 15, a broad based which is weighted is formed which maximally resists overturning of the entire combination dish 10. The inventor believes that this is one of the basic reasons why the other forms of moated animal feeding dishes have failed to be adopted and used by animal owners given the seemingly highly desireable moated combination food and water dish for animals.

Another highly important feature provided by this unique moated food and water feeding dish 10 for animals is that it is so designed and constructed that when the water is poured therefrom it will not flow into the centrally disposed food receptacle portion of the dish 10.

Figure 6:
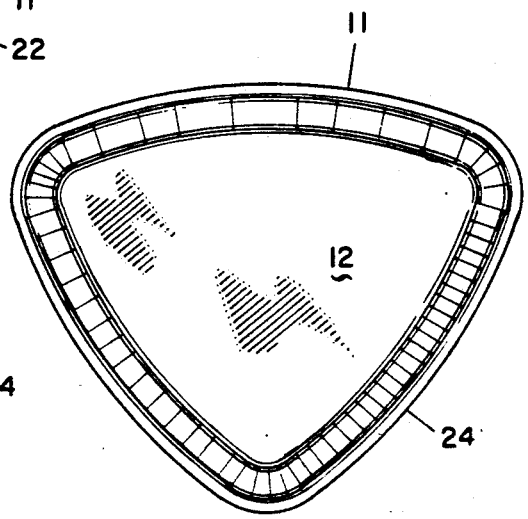
FIG. 6 is a bottom view of the invention.
Figure 3:
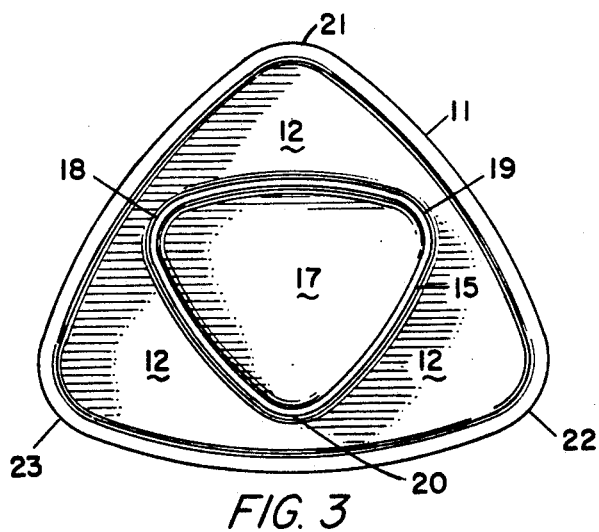
FIG. 3 is a top view of the invention.
Figure 5:
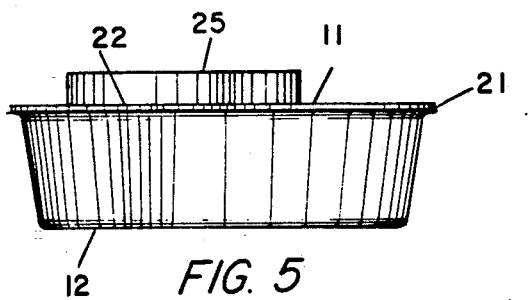
FIG. 5 is a side elevational view of the invention showing the wall of the invention between one of the corners and the relatively flat wall oppositely disposed from the corner.
Figure 4:
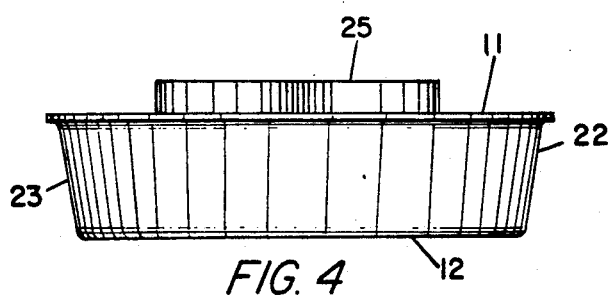
FIG. 4 is a side elevational view of the invention showing the wall of the present invention between a pair of corners of the invention.

One of the significant features of the present preferred embodiment of the within invention is to provide a moated feeding dish 10 where the rim 25 of the second dish 15, which is used as the food dish, is disposed at an elevation which is higher than the level of the water, or the "moating", which is limited by the elevation of the rim forming the lip 24, as shown in FIG. 6 of the Drawings, about the dish which forms the outer dish 11 portion of the moated feeding dish 10, so that the water does not splash over the rim 25 and enter the central food dish 15.

By this unique combination and arrangement of triangularly shaped receptacles, a unique combination food and water animal dish is created which allows the animal to conveniently eat the food and then by merely turning its head either to the right or to the left it is able to readily drink water from the second and larger triangular receptacle which is holding the water and forming, as it were, a "moat" surrounding the first, and smaller triangular receptacle, which is utilized for the animal food. By not requiring the animal to move from one position to another by shifting or moving its feet, the opportunity for overturning the combined food and water dish 10 is significantly reduced.

With this arrangement, the centrally disposed receptacle with its triangular shape and triple contact points for a cylindrical body such as a can of animal food, such cylindrical food can be sized so as to be frictionally engageable can in which the food is packed and provided by the producer.

For example, the food dish which is the second dish 15, is moated, that is, with the arrangement of the second triangularly shaped dish 15, it is surrounded by the drinking water for the animal. Since it is moated, it is very difficult, if not impossible, for ants and other small, crawling insects and snails, such as gastropods, from crawling into the first dish 11 to eat and/or contaminate the food in the second dish 15 because in order to do so they must crawl or pass through the "moat" of water surrounding the dish 15 containing the food.

Further, such an arrangement with the two triangularly-shaped dishes 11 and 15 with a shared floor 12, provides a outer ring of greater weight, that it, the weight of the drinking water in the first dish 11 surrounding the second dish 15, which effectively lowers the overall center-of-gravity of the entire combination of dish-food-water to prevent the combination from being readily tipped over by an overly zealous and near starving, hungry, over eager animal.

Another extremely favorable feature is that for smaller pets or animals such as cats is provided by this unique combination of feeding dishes for animals in that the walls of the first dish 11 can be so disposed a to allow the feeding of such animals in a rather convenient fashion since each can position themselves at one of the corners of the apecies of the triangularly-shaped first dish 11.

Further, a lip 24 is provided to provide a stiffening element for the upper portion of the wall 13 which is farthest from the sidewall 13 juncture with the floor 12.

By utilization of the reverse triangles forming the dishes 11 and 15, and positioning the dishes 11 and 15 one inside of the other as disclosed herein, when the water is placed in between the side wall 13 of the first dish 11 and the side wall 16 of the second dish 15, the water is forced to the extremities of the three inside corners of the apexes 21, 22 and 23 of the larger first dish 11. This forces the weight distribution of the container, namely: the combined food and water dish 10, to reside about the food dish 15, which is the smaller of the two dishes. As a result, a very stable and relatively immovable dish 10 is created.

The unique triangular shape of the dish 10 provides this combination food and water animal feeder dish when it is placed out of doors against a wall or a corner of a building, as is often the case, when the animal eats, it oftentimes moves the dish with the food and water in it along the ground. This movement increases more frequently as the water and the food in the animal into a corner or against a wall without restricting the animal's eating and drinking activities. With other forms of animal feeding dishes, such unrestricted eating and drinking cannot take place because of the interference presented by the wall or the corner of the building.

Because of the propensity of a plurality of parts to somehow separate, especially in the cases of dishes, as here, which are used by animals for feeding and drinking purposes, it is quite important and highly desirable to construct such a dish 10 as herein described formed as a single, integral structure. One of the most highly desirable materials to use in the creation of a dish 10 is plastic material. Such material is readily moldable into the shape presented herein and is both durable and is easily sanitized, or cleaned. Such plastics as polyethylene and polystyrene and even such thermomoldable plastics such as melamine are readily usable in a product such as is presented herein.

Another important characteristic of the invention herein is the use of a flange disposed about the rim of the sidewall of the first dish 11. Such a flange is used for the purpose of maintaining the sidewall stiffness so that the sidewall can maintain its upright vertical position to hold the water in the dish 11.

Of course, it should be clearly understood and is quite clearly shown in the drawings herein that the apexes 18, 19 and 20 of the smaller dish 15 do not touch or contact the sidewall 13 of the first dish 11. If this were permitted to occur, the water in the first dish 11 and about the second dish 15 would be blocked. Should this occur, the second dish 15 would not be moatably isolated from the insects and other crawly animals.

While the foregoing description sets forth the invention in specific terms, it is to be understood that numerous changes in the shape, size and materials may be resorted to without departing from the spirit and scope of the invention as claimed hereinafter.

Having described the invention what is claimed as new is:

1. An improved moated combination food and water animal feeding dish for improved resistance to tip over by maximizing the overall combined weight distribution characteristics of the food-water-dish combination, comprising:
   (a) a floor forming a base for the combination dish;
   (b) a first triangularly shaped receptacle having vertically arranged walls, the bottoms of which are secured to the floor to form a first dish; and
   (c) a second triangularly shaped receptacle having vertically arranged walls, the bottoms of which are secured to the floor to form a second dish, said vertically arranged walls being peripherally disposed about the vertically arranged walls of the first dish, said second dish being disposed in offsetting fashion with respect to the first dish whereby each apex of the first dish is positioned in close proximity to corresponding mid-point of the vertically arranged walls and disposed between a pair of said apexes of the second dish.

2. The-improved dish of claim 1 wherein the entire dish is formed of a single, solid piece of material.

3. The improved dish of claim 2 wherein the material is plastic.

4. The improved animal feeding and drinking dish of claim 1 further comprising a flanged rim about the top of the vertical walls of the first dish to maintain vertical wall stiffness.

5. The improved animal feeding and drinking dish of claim 1 wherein the apexes of the second dish are spaced apart from the walls of the first dish.

6. The improved animal feeding and drinking dish of claim 1 wherein the upper portions of the vertically arranged walls of the first dish being disposed above the upper portions of the vertically arranged walls of the second dish to prevent the liquid poured into the second dish from flooding into the first dish containing the food.

* * * * *